United States Patent [19]
Glassey

[11] Patent Number: 5,806,494
[45] Date of Patent: Sep. 15, 1998

[54] HYDRAULICALLY ACTUATED FUEL INJECTION SYSTEM WITH INTEGRATED ACTUATION FLUID RAIL AND INJECTORS

[75] Inventor: Stephen F. Glassey, Ft. Morgan, Colo.

[73] Assignee: Caterpillar Inc., Peoria, Ill.

[21] Appl. No.: 907,222

[22] Filed: Aug. 6, 1997

[51] Int. Cl.$^6$ ............................................. F02M 41/00
[52] U.S. Cl. ............................................. 123/456; 123/470
[58] Field of Search ............................. 123/446, 447, 123/456, 470

[56] References Cited

U.S. PATENT DOCUMENTS

| | | | |
|---|---|---|---|
| 4,751,904 | 6/1988 | Hudson, Jr. | 123/470 |
| 4,996,961 | 3/1991 | Usui | 123/456 |
| 4,996,962 | 3/1991 | Usui | 123/456 |
| 5,058,554 | 10/1991 | Takeda et al. | 123/456 |
| 5,143,039 | 9/1992 | Gmelin | 123/470 |
| 5,168,855 | 12/1992 | Stone | 123/446 |
| 5,211,149 | 5/1993 | DeGrace, Jr. | 123/470 |
| 5,273,015 | 12/1993 | Yonekawa et al. | 123/456 |
| 5,297,523 | 3/1994 | Hafner et al. | 123/456 |
| 5,299,542 | 4/1994 | Hafner | 123/470 |
| 5,325,834 | 7/1994 | Ballheimer et al. | 123/446 |
| 5,372,113 | 12/1994 | Smith | 123/470 |
| 5,392,749 | 2/1995 | Stockner et al. | 123/456 |
| 5,423,303 | 6/1995 | Bennett | 123/527 |
| 5,485,820 | 1/1996 | Iwaszkiewicz | 123/446 |
| 5,531,202 | 7/1996 | Lorraine | 123/456 |

*Primary Examiner*—Thomas N. Moulis
*Attorney, Agent, or Firm*—Liell & McNeil

[57] ABSTRACT

A hydraulically actuated fuel injection system includes a plurality of hydraulically actuated fuel injectors mounted into an actuation fluid rail. The injector and rail combination are mounted to an engine. The rail is connected to a source of relatively high pressure actuation fluid. The injectors are in fluid communication with the rail by an inner cavity in the rail and an actuation fluid inlet in the injector. The rail is a piece of metallic tubing with a plurality of bores therethrough for insertion of the injectors. The injectors are sealed from leakage of actuation fluid between the bores and the injectors with a pair of O-rings. A source of relatively low pressure fuel is provided separate from the actuation fluid rail to supply fuel to the injector through a fuel supply inlet. A bracket is used to fasten the injectors to the rail with a fastener. The same fastener may be used to mount the rail to the engine.

20 Claims, 3 Drawing Sheets

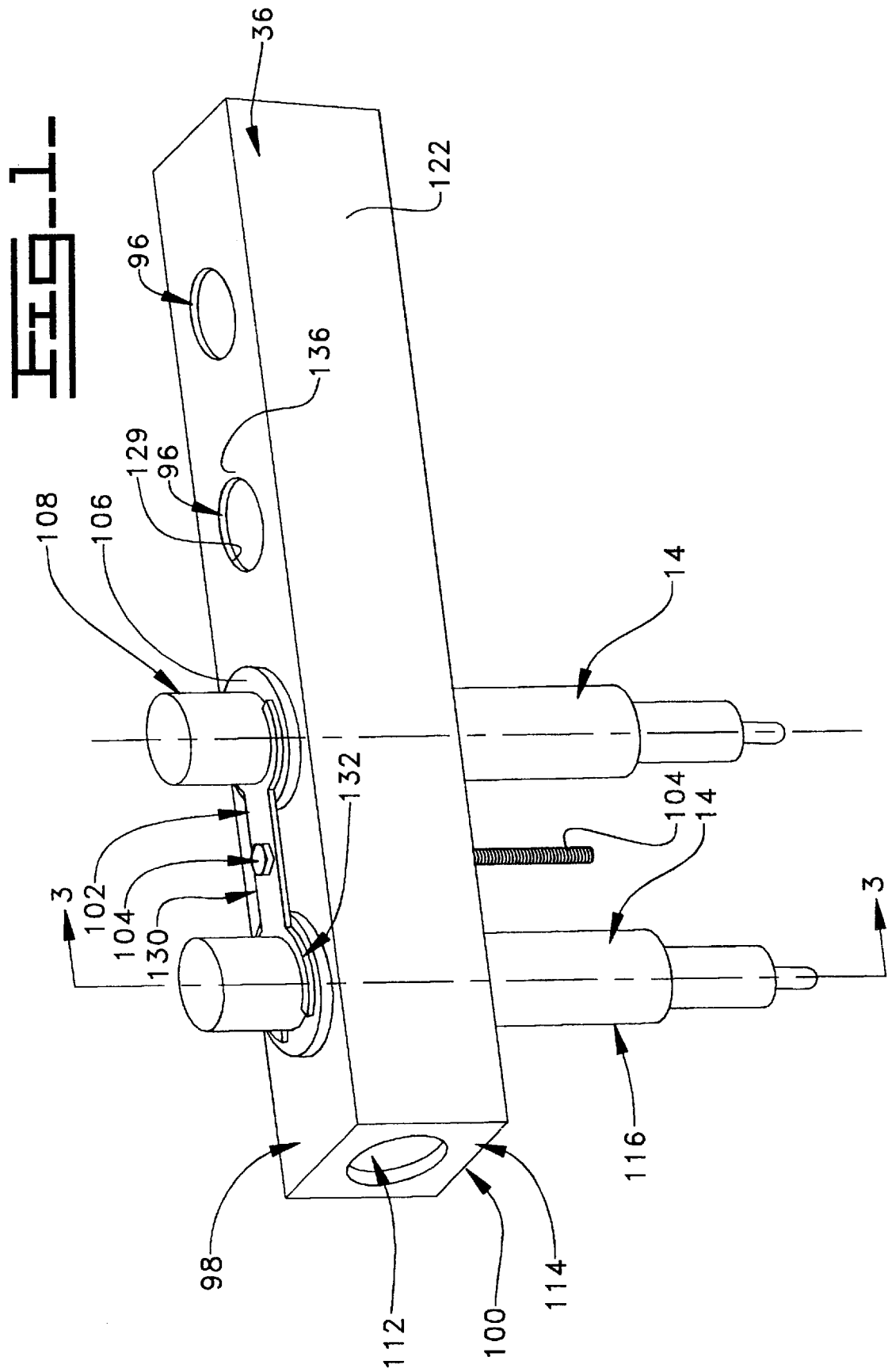

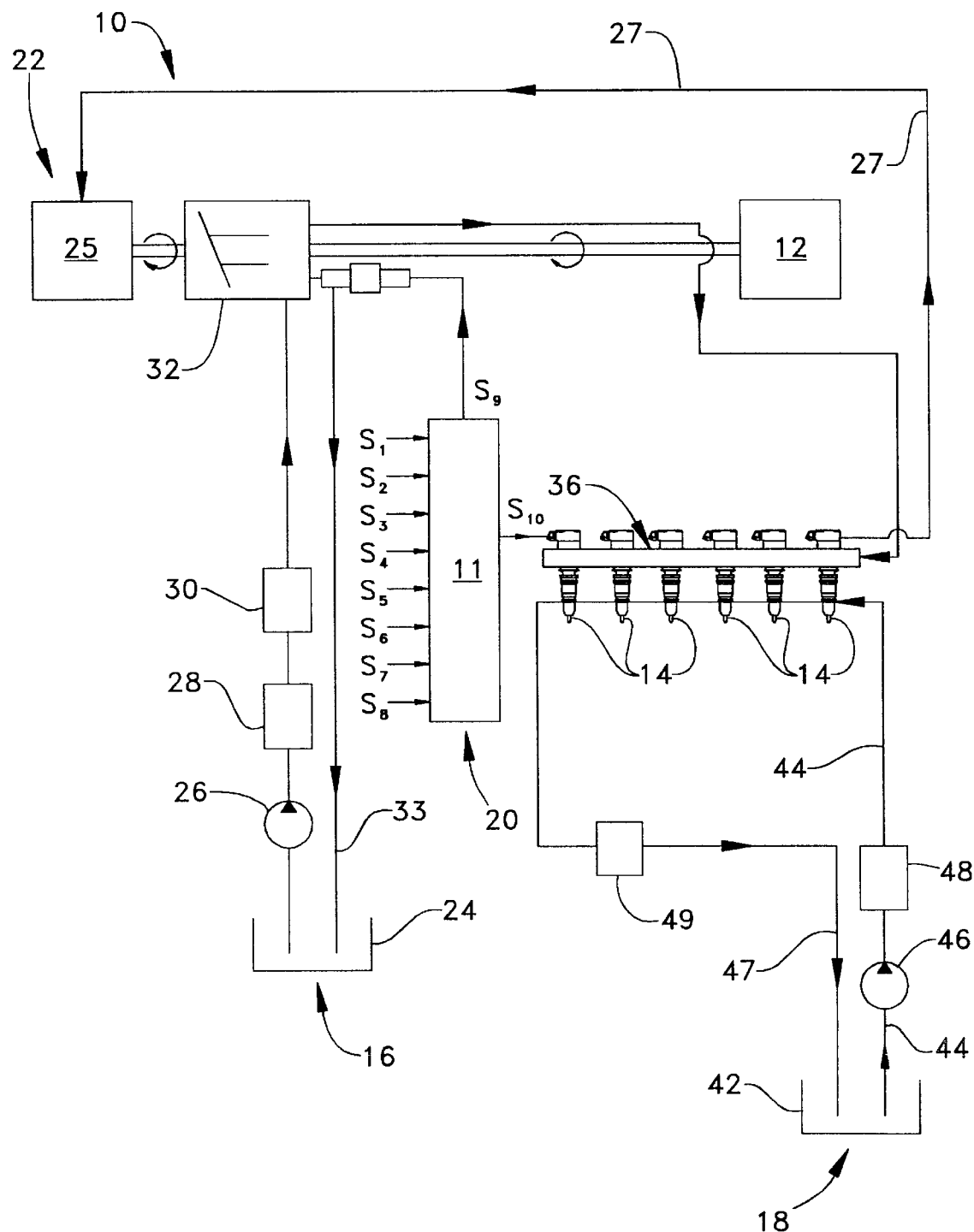
Fig_2_

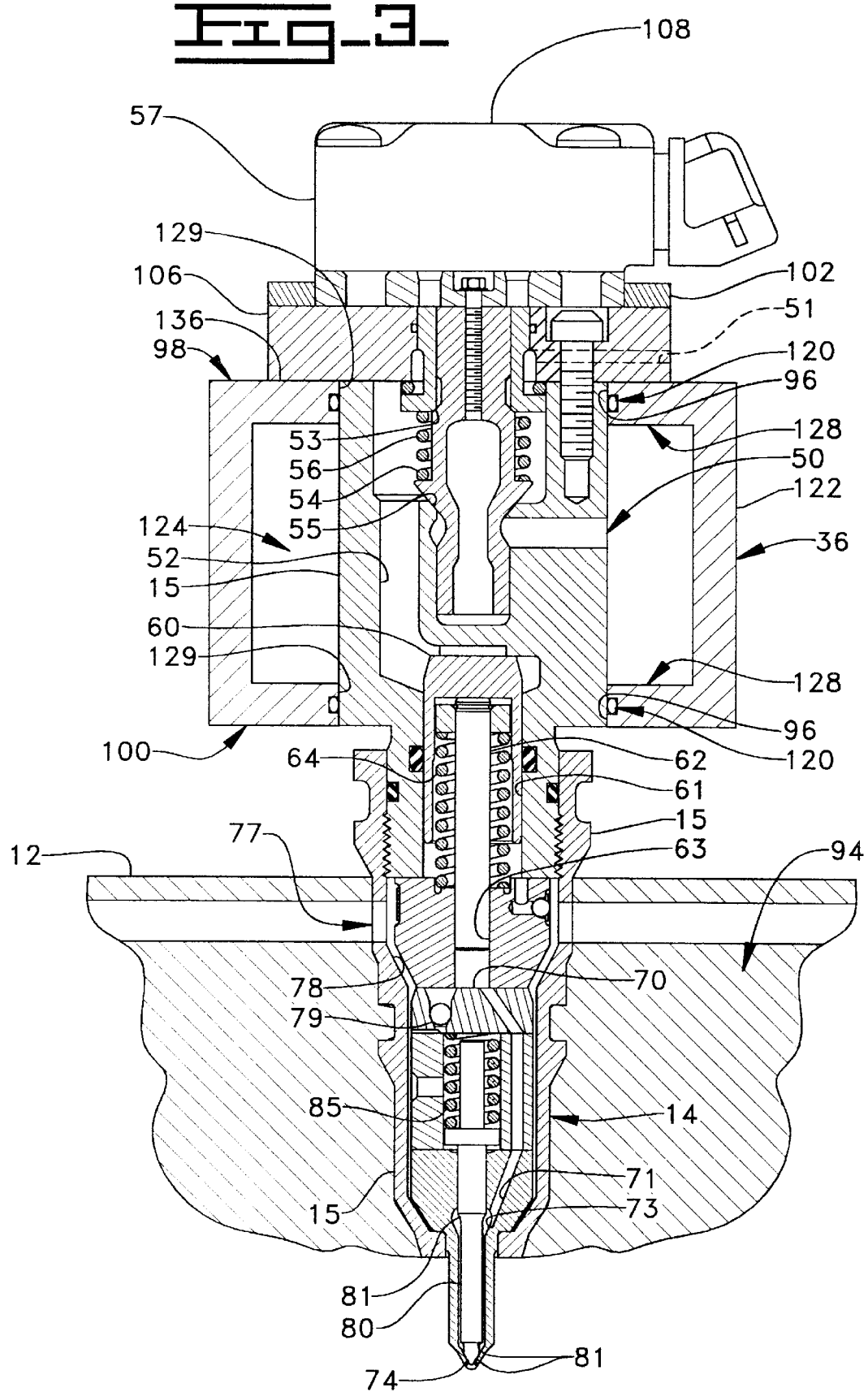

HYDRAULICALLY ACTUATED FUEL INJECTION SYSTEM WITH INTEGRATED ACTUATION FLUID RAIL AND INJECTORS

TECHNICAL FIELD

The present invention relates generally to hydraulically actuated fuel injectors, and more particularly to such injector being integrated with an actuation fuel rail.

BACKGROUND ART

In a hydraulically actuated fuel injection system a plurality of fuel injectors each has an actuation fluid inlet that is connected to a source of high pressure actuation fluid. The injector also includes a fuel supply passage connected to a source of fuel fluid that is often different from the actuation fluid. The injector also includes an actuation fluid drain that is connected to a low pressure actuation fluid reservoir via a drain passage. A control valve is positioned in the actuation fluid cavity of the injector and capable of moving between a first position in which the actuation fluid inlet is open and the actuation fluid drain is closed, and a second position in which the actuation fluid inlet is closed and the actuation fluid drain is open. A computer is in communication with and capable of controlling the control valve to initiate and end injection event.

In prior art systems, when the actuation fluid rail is not incorporated into the engine head, the actuation fluid supply rail is separate from the fuel injectors and each injector is supplied with actuation fluid by a connection passage, commonly known as a jumper tube. One disadvantage of the separate connection passages is that some pressure loss inevitably occurs and in some instances can or require a higher rail pressure to compensate in order to ensure injector performance. One other drawback is that the connection passage is often a difficult shape to manufacture, adding to expenses. Additionally, because junctions are necessary to connect the connection passage to the supply rail and the injector, multiple seals are needed and more potential areas for leaks exists. In many engines, particularly smaller diesel engines, space is at a premium and the separate rail becomes difficult to fit into the available space. Space availability problems are often most acute when a diesel engine that originally used cam driven fuel injectors is retrofitted with a hydraulically actuated fuel injection system. The present invention is directed to overcoming one or more of the problems as set forth above.

DISCLOSURE OF THE INVENTION

A hydraulically actuated fuel injection system includes a plurality of hydraulically actuated fuel injectors. Each of the injectors has an actuation fluid inlet and a fuel inlet. The system includes an actuation fluid rail with an inner cavity and a plurality of bores therethrough that are distributed along the length of the rail. Each of the plurality of hydraulically actuated fuel injectors are positioned in a different one of the plurality of bores so that the actuation fluid inlet is positioned within the inner cavity and the fuel inlet is positioned outside of the actuation fluid rail. The system further includes means for attaching the actuation fluid rail and the plurality of hydraulically actuated fuel injectors to an engine.

BRIEF DESCRIPTION OF THE DRAWINGS

FIG. 1 is a perspective view of an integrated fuel rail and fuel injectors of the present invention.

FIG. 2 is a schematic illustration of a hydraulically actuated fuel injection system according to one embodiment of the present invention.

FIG. 3 is a sectioned side elevational view of a hydraulically-actuated fuel injector and the actuation fluid rail along line 3—3 in FIG. 2 according to an embodiment of the present invention.

BEST MODE FOR CARRYING OUT THE INVENTION

Referring now to FIG. 1, an actuation fluid rail 36 is shown with a plurality of hydraulically actuated electronically-controlled fuel injectors 14 assembled into the rail 36. The rail 36 is mounted to an engine head 94 (FIG. 3) as described later. The rail 36 has a plurality of bores 96 that pass from the top 98 of the rail 36 and also through the bottom 100 of the rail 36. A bracket 102 holds the injectors 14 in place in the rail 36. The bracket 102 has a center portion 130 and holder portions 132 on either end for engaging the injectors 14. In one embodiment, the holder portions 132 are forked, forming a U-shape to fit around injectors 14. The bracket 102 is preferably fastened to the rail with a fastener 104 that may pass completely through rail 36 and fasten to the engine head or may thread only through a bore in the top 98. The example fastener 104 depicted is a bolt that passes through the center portion 130, but any suitable fastener known in the art will work. The bracket 102 holds two injectors 14 by cooperating with an annular protuberance 106 on the upper portion 108 of the injector 14. The injector 14 rests on flat surface 136 (FIG. 3) on the top 98 of rail 36. The rail 36 is supplied with high pressure actuation fluid through an opening 112 at the end 114. The lower portion 116 of the injector 14 passes through the rail 36 and into the cylinder head bore of engine head 94 (FIG. 3).

Referring now to FIG. 2, there is shown an embodiment of a hydraulically actuated electronically controlled fuel injection system 10 in an example configuration as adapted for a direct injection diesel cycle internal combustion engine 12. Fuel system 10 includes one or more hydraulically actuated electronically controlled fuel injectors 14, which are adapted to be positioned in a respective cylinder head bore of engine 12 through the actuation fluid rail 36. Fuel system 10 includes an apparatus or means 16 for supplying actuating fluid to the rail 36 and thereby each injector 14. The system 10 includes an apparatus or means 18 for supplying fuel to each injector, a computer 20 for electronically controlling the fuel injection system, and an apparatus or means 22 for recirculating actuation fluid and for recovering hydraulic energy from the actuation fluid leaving each of the injectors.

The actuation fluid supply means 16 preferably includes an actuation fluid sump 24, a relatively low pressure actuation fluid transfer pump 26, an actuation fluid cooler 28, one or more actuation fluid filters 30, a high pressure pump 32 for generating relatively high pressure in the actuation fluid and at least one relatively high pressure actuation fluid rail 36. Because the injectors 14 are mounted through the rail 36, the injectors 14 are in fluid communication with the outlet from the relatively high pressure actuation fluid pump 32. The rail 36 allows the actuation fluid to pass from the high pressure pump 32 into the actuation fluid inlet 50 (FIG. 3) of each injector 14.

Actuation fluid leaving the actuation fluid drain 51 (see FIG. 3) of each injector 14 enters a recirculation line 27 that carries the same to the hydraulic energy recirculating or recovering means 22. A portion of the recirculated actuation fluid is channeled to high pressure actuation fluid pump 32 and another portion is returned to actuation fluid sump 24 via a recirculation line 33.

Any available engine fluid is preferably used as the actuation fluid in the present invention. However, in the preferred embodiments, the actuation fluid is engine lubricating oil and the actuation fluid sump 24 is an engine lubricating oil sump. This allows the fuel injection system to be connected directly into the engine's lubricating oil circulation system. Alternatively, the actuation fluid could be provided by a fuel tank 42 or another source, such as coolant fluid, etc.

The fuel supply means 18 preferably includes a fuel tank 42, a fuel supply passage 44 arranged in fluid communication between fuel tank 42, a relatively low pressure fuel transfer pump 46, one or more fuel filters 48, a fuel supply regulating valve 49, and a fuel circulation and return passage 47 arranged in fluid communication between injectors 14 and fuel tank 42.

The computer 20 preferably includes an electronic control module 11 which controls (1) the fuel injection timing; (2) the total fuel injection quantity during an injection cycle; (3) the fuel injection pressure; (4) the number of separate injections or injection segments during each injection cycle; (5) the time intervals between the injection segments; (6) the fuel quantity of each injection segment during an injection cycle; (7) the actuation fluid pressure; and (8) any combination of the above parameters. Computer 20 receives a plurality of sensor input signals S1–S8, which correspond to known sensor inputs, such as engine operating condition, load, etc., that are used to determine the precise combination of injection parameters for a subsequent injection cycle. In this example, computer 20 issues a control signal S9 to control the actuation fluid pressure and a control signal S10 to control the actuation fluid control valve within each injector 14. Each of the injection parameters are variably controllable independent of engine speed and load. In the case of injector 14, control signal S10 represents current to the solenoid 57 (FIG. 3) commanded by computer 20.

Referring now to FIG. 3, hydraulically-actuated fuel injector 14 includes an injector body 15 made up of various components attached to one another in a manner well known in the art. Injector body 15 defines an actuation fluid cavity 52 that is open to a piston bore 61, a high pressure actuation fluid inlet 50 and a low pressure actuation fluid drain 51. A control valve includes a poppet valve member 55 that is attached to and moved by a solenoid 57. A compression spring 56 normally biases poppet valve member 55 to its lower seated position which closes actuation fluid cavity 52 to actuation fluid inlet 50. When in this position, actuation fluid cavity 52 is opened to low pressure actuation fluid drain 51 past seat 53. When solenoid 57 is energized, poppet valve member 55 is lifted to open lower seat 54 and close seat 53, which simultaneously closes low pressure actuation fluid drain 51 and opens actuation fluid inlet 50 to actuation fluid cavity 52. Each injection event is initialized by energizing solenoid 57 to permit high pressure actuation fluid to flow into actuation fluid cavity 52 to act on the upper surface of an intensifier piston 60.

Intensifier piston 60 is positioned to reciprocate in piston bore 61 between an upper position, as shown, and a lower position. Injector body 15 also defines a plunger bore 63 that slidably receives a plunger 62. Plunger 62 reciprocates between a retracted position, as shown, and an advanced position. A compression return spring 64 normally biases piston 60 and plunger 62 to their respective upper and retracted positions. A portion of plunger bore 63 and plunger 62 define a fuel pressurization chamber 70.

Fuel enters injector 14 through a fuel inlet 77 and then travels along a fuel supply passage 78, past ball check 79 and into fuel pressurization chamber 70, when plunger 62 and piston 60 are undergoing their return stroke between injection events. Ball check valve 79 prevents the back flow of fuel from fuel pressurization chamber 70 into fuel supply passage 78 when plunger 62 and piston 60 are undergoing their downward stroke during an injection event.

Injector body 15 also defines a nozzle chamber 73 that opens to a nozzle outlet 74. Nozzle chamber 73 is connected to fuel pressurization chamber 70 via a nozzle supply passage 71. During an injection event, fuel flows from fuel pressurization chamber 70, through nozzle supply passage 71, into nozzle chamber 73 and eventually out of nozzle outlet 74. A needle valve member 80 is positioned to reciprocate in nozzle chamber 73 between an open position in which nozzle outlet 74 is open and a closed position, as shown, in which nozzle outlet 74 is blocked. A biasing spring 85 normally biases needle valve member 80 to its closed position. However, when fuel pressure within nozzle chamber 73 exceeds a valve opening pressure, the hydraulic force acting on lifting surface(s) 81 causes the needle valve member to lift against the action of biasing spring 85 to its open position.

Injector 14 is positioned through the actuation fluid rail 36 through a bore 96 that passes completely therethrough. Bore 96 is defined by a pair of separated annular walls 129. The injector 14 is preferably cylindrical in shape and is sealed at top 98 and bottom 100 with a pair of O-ring seals 120 preferably made from a suitable material, such as poly tetra floraethylene PTFE. The rail 36 may be made from a common piece of metallic tubing 122 that forms an inner cavity 124. The inner cavity 124 creates a single flow path for the high pressure actuation fluid. The metallic tubing of rail 36 preferably has a substantially uniform cross section. In one preferred embodiment shown the metallic tubing is of rectangular cross section, but may be of any suitable geometric shape. The metallic tubing is preferably made from relatively inexpensive extruded or drawn steel. However, rail 36 can be cast to not have a uniform cross section. The tube 122 generally has two separated annular walls 128 that form the top 98 and bottom 100 of the rail 36. The top 98 has a flat surface 136 that injectors 14 rest against when mounted into rail 36. In one embodiment, the walls 128 are at least ¼" thick thereby providing enough space for O-rings 120 to seal the gap between the outside dimension of the injectors 14 and the bores 96 in the walls 128. The bores 96 and the outside dimension of the injectors 14 are typically circular although the injectors 14 may have another shape requiring extra machining to allow for fitting. A thinner walled rail 36 may be used but this might require a special sleeve to allow room for sealing the insertion site against leakage between injectors 14 and rail 36.

In an alternative embodiment, the rail 36 may be manufactured from a steel casting. Making the rail 36 from a steel casting would allow for optimization of the amount of material necessary to practice the invention. The walls 128 would be thicker in the region of the bores 96 to allow for sealing the gap and the wall could be thinner in the region between the injectors. The non-uniform design would reduce the amount of material and therefore the weight of the rail 36. Another feature of a cast rail 36 is that the rail 36 could be fastened to the engine 12 separate from the injectors 14 attachment to the rail 36. Separate mounting features can be cast into the edge of the rail 36. Separate fasteners 104 could also be used in conjunction with the metallic tube 122, requiring a bracket to be welded to the tube 122.

Industrial Applicability

The present invention finds potential application in any hydraulically actuated fuel injection system, especially those that utilize a hydraulic actuation fluid that is different from the fuel fluid. The present invention is particularly well suited for the installation of a hydraulically actuated fuel injection system on an engine in which space availability for an actuation fluid rail is limited. Because the fuel injectors and actuation fluid rail are integrated, very little amount of space away from the injector bores in the engine is needed in order to accommodate the actuation fluid rail. Such is often the case in many smaller size diesel engines that are being retrofitted with a hydraulically actuated fuel injection system in place of a cam driven fuel injection system.

It should be understood that the above description is intended for illustrative purposes only and is not intended to limit the scope of the present invention in any way. Those skilled in the art will no doubt appreciate that the present invention can be made in a wide variety of shapes and sizes, and use various fastening mechanisms for attachment to an engine, without departing from the intended scope of the invention. In addition, the present invention could be modified to reduce noise transmission to the engine from the fuel injection system by isolating the actuation fluid rail and fuel injectors from the engine by positioning resilient members, such as rubber or bellville washers, between the fuel injection system and the engine. In such a case, there would be no rigid attachment between the fuel injection system and the engine, thus allowing the fuel injectors to possibly slide up and down in their injector bores to reduce noise transmission, without otherwise altering the performance of the engine and/or injection system.

Other objects and advantages of the present invention can be gained by a review of the attached drawings, the claims and the above specification.

What is claimed is:

1. A hydraulically actuated fuel injection system comprising:
   a plurality of hydraulically actuated fuel injectors, each having an actuation fluid inlet and a fuel inlet;
   an actuation fluid rail having a length, an inner cavity and a plurality of bores therethrough that are distributed along said length;
   each of said plurality of hydraulically actuated fuel injectors being positioned in a different one of said plurality of bores so that said actuation fluid inlet is positioned within said inner cavity and said fuel inlet is positioned outside of said actuation fluid rail; and
   said plurality of hydraulically actuated fuel injectors being attached to said actuation fluid rail with at least one fastener.

2. The hydraulically actuated fuel injection system of claim 1 where in said actuation fluid rail includes a metallic tube with a substantially uniform cross sectional shape.

3. The hydraulically actuated fuel injection system of claim 2 wherein said substantially uniform cross sectional shape is generally rectangular.

4. The hydraulically actuated fuel injection system of claim 3 wherein said metallic tube is made from one of either drawn or extruded steel.

5. The hydraulically actuated fuel injection system of claim 1 wherein each of said plurality of bores is defined by a pair of separated annular walls; and
   at least two O-ring seals, each in contact with a different one of said pair of separated annular walls and each of said plurality of hydraulically actuated fuel injectors, and are sized to substantially prevent leakage of actuation fluid from said actuation fluid rail around said plurality of hydraulically actuated fuel injectors.

6. The hydraulically actuated fuel injection system of claim 5 wherein each of said pair of separated annular walls has a wall thickness greater than about one fourth of an inch.

7. The hydraulically actuated fuel injection system of claim 1 wherein said actuation fluid rail defines a single flow path therethrough.

8. The hydraulically actuated fuel injection system of claim 1 wherein each of said plurality of hydraulically actuated fuel injectors includes an upper portion in a position in contact with a top side of said actuation fluid rail; and
   said means for attaching includes at least one bracket holding said plurality of hydraulically actuated fuel injectors in said position with said at least one fastener.

9. The hydraulically actuated fuel injection system of claim 8 wherein said at least one bracket is positioned above said top side of said actuation fluid rail; and
   said at least one fastener penetrate said inner cavity of said actuation fluid rail through said top side.

10. The hydraulically actuated fuel injection system of claim 9 wherein each of said at least one bracket includes a central portion with a fastener bore therethrough and a pair of holder portions located on opposite sides of said central portion; and
    each of said pair of said holder portions being in contact with a different one of said plurality of hydraulically actuated fuel injectors.

11. The hydraulically actuated fuel injection system of claim 10 wherein each of said pair of holder portions are fork shaped and define a generally U-shaped opening.

12. The hydraulically actuated fuel injection system of claim 9 wherein said at least one fastener passes completely through said actuation fluid rail.

13. The hydraulically actuated fuel injection system of claim 1 wherein said actuation fluid rail is connected to a source of relatively high pressure actuation fluid; and
    said fuel inlet of each of said plurality of hydraulically actuated fuel injectors is connected to a source of relatively low pressure fuel fluid that is different from said actuation fluid.

14. A hydraulically actuated fuel injection system comprising:
    a plurality of hydraulically actuated fuel injectors, each having an upper portion, an actuation fluid inlet and a fuel inlet;
    an actuation fluid rail having a length, an inner cavity and a plurality of bores therethrough that are distributed along said length, and said actuation fluid rail having a top side with a flat area surrounding each of said plurality of bores;
    at least two O-ring seals in contact with each of said plurality of hydraulically actuated fuel injectors and said actuation fluid rail that are sized to substantially prevent leakage of actuation fluid from said actuation fluid rail around said plurality of hydraulically actuated fuel injectors;
    each of said plurality of hydraulically actuated fuel injectors being positioned in a different one of said plurality of bores so that said actuation fluid inlet is positioned within said inner cavity and said fuel inlet is positioned outside of said actuation fluid rail, and said upper portion of each of said hydraulically actuated fuel injectors being in a position in contact with said flat area of said top side of said actuation fluid rail; and said plurality of hydraulically actuated fuel injectors being attached to said actuation fluid rail with at least one fastener and at least one bracket.

15. The hydraulically actuated fuel injection system of claim 14 wherein said actuation fluid rail includes a metallic tube with a substantially uniform cross sectional shape that is generally rectangular.

16. The hydraulically actuated fuel injection system of claim 14 wherein said at least one bracket is positioned above said top side of said actuation fluid rail and includes a central portion with a fastener bore therethrough and a pair of holder portions located on opposite sides of said central portion;

each of said pair of said holder portions being in contact with a different one of said plurality of hydraulically actuated fuel injectors; and said at least one fastener penetrates said inner cavity of said actuation fluid rail through said top side.

17. The hydraulically actuated fuel injection system of claim 16 wherein said at least one fastener passes completely through said actuation fluid rail.

18. The hydraulically actuated fuel injection system of claim 14 wherein said actuation fluid rail is connected to a source of relatively high pressure actuation fluid; and said fuel inlet of each of said plurality of hydraulically actuated fuel injectors is connected to a source of relatively low pressure fuel fluid that is different from said actuation fluid.

19. A hydraulically actuated fuel injection system comprising:

a plurality of hydraulically actuated fuel injectors, each having an upper portion, an actuation fluid inlet and a fuel inlet;

an actuation fluid rail having a length, an inner cavity and a plurality of bores therethrough that are distributed along said length, and said actuation fluid rail having a top side with a flat area surrounding each of said plurality of bores, and said actuation fluid rail includes a metallic tube with a substantially uniform cross sectional shape that is generally rectangular;

at least two O-ring seals in contact with each of said plurality of hydraulically actuated fuel injectors and said actuation fluid rail that are sized to substantially prevent leakage of actuation fluid from said actuation fluid rail around said plurality of hydraulically actuated fuel injectors;

each of said plurality of hydraulically actuated fuel injectors being positioned in a different one of said plurality of bores so that said actuation fluid inlet is positioned within said inner cavity and said fuel inlet is positioned outside of said actuation fluid rail, and said upper portion of each of said hydraulically actuated fuel injectors being in a position in contact with said flat area of said top side of said actuation fluid rail;

said actuation fluid rail being attached to said plurality of hydraulically actuated fuel injectors with, at least one fastener and at least one bracket, and said at least one bracket including a plurality of holder portions, and each of said holder portions being in contact with a different one of said plurality of hydraulically actuated fuel injectors.

20. The hydraulically actuated fuel injection system of claim 19 wherein said at least one fastener passes completely through said actuation fluid rail;

said actuation fluid rail is connected to a source of relatively high pressure actuation fluid; and said fuel inlet of each of said plurality of hydraulically actuated fuel injectors is connected to a source of relatively low pressure fuel fluid that is different from said actuation fluid.

\* \* \* \* \*